US007289585B2

(12) United States Patent
Sandhu et al.

(10) Patent No.: US 7,289,585 B2
(45) Date of Patent: Oct. 30, 2007

(54) MULTICARRIER RECEIVERS AND METHODS FOR SEPARATING TRANSMITTED SIGNALS IN A MULTIPLE ANTENNA SYSTEM

(75) Inventors: Sumeet Sandhu, San Jose, CA (US); Lei Shao, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 662 days.

(21) Appl. No.: 10/814,095

(22) Filed: Mar. 30, 2004

(65) Prior Publication Data

US 2005/0152484 A1    Jul. 14, 2005

(51) Int. Cl.
*H04B 7/10* (2006.01)
(52) U.S. Cl. .................................................... 375/347
(58) Field of Classification Search ................ 375/347, 375/316, 299; 455/67.11
See application file for complete search history.

(56) References Cited

U.S. PATENT DOCUMENTS

| 2002/0136328 A1* | 9/2002 | Shimizu ..................... 375/316 |
| 2004/0185786 A1* | 9/2004 | Mirbaha et al. ......... 455/67.11 |
| 2007/0086536 A1* | 4/2007 | Ketchum et al. ........... 375/260 |

FOREIGN PATENT DOCUMENTS

WO    WO-05029759 A2    3/2005
WO    WO-05029759 A3    3/2005

OTHER PUBLICATIONS

"International Search Report for corresponding PCT Application No. PCT/US2005/001206", (Jun. 24, 2005), 4 pages.
Böhnke, R , et al., "Reduced Complexity MMSE Detection for BLAST Architectures", *Proceedings, IEEE Global Telecommunication Conference (GLOBECOM '03)*, 7(7), (Dec. 1, 2003), 2258-2262.
Damen, M. O., et al., "On Maximum-Likelihood Detection and the Search for the Closest Lattice Point", *IEEE Transactions on Information Theory*, 49(10), (Oct. 1, 2003), 2389-2402.
Higuchi, K., et al., "Adaptive Selection of Surviving Symbol Replica Candidates Based on Maximum Reliability in QRM-MLD for OFCDM MIMO Multiplexing", *Proceedings, IEEE Global Telecommunications Conference(GLOBECOM '04)*, (Nov. 29, 2004), 2480-2486.
Seethaler, D., et al., "Efficient Approximate-ml Detection for MIMO Spatial Multiplexing Systems by Using a 1-D Nearest Neighbor Search", *Proceedings of the 3rd IEEE International Symposium on Signal Processing and Information Technology (ISSPIT 2003)*, (Dec. 14, 2003), 290-293.

(Continued)

*Primary Examiner*—Khai Tran
(74) *Attorney, Agent, or Firm*—Schwegman, Lundberg & Woessner, P.A.; Gregory J. Gorrie (57) ABSTRACT

A multicarrier receiver includes spatial channel decouplers to separate signal components that are separately transmitted with more than one transmit antenna or over more than one spatial channel.

33 Claims, 3 Drawing Sheets

OTHER PUBLICATIONS

Yue, J., et al., "Channel Estimation and Data Detection for MIMO-OFDM Systems", *Proceedings, IEEE Global Telecommunications Conference (GLOBECOM '03)*, 7(7), (Dec. 1, 2003), 581-585.

"International Search Report for corresponding PCT Application No. PCT/US2004/029768", (Mar. 10, 2005), 6 pgs.

Paulraj, A., *Introduction to Space-Time Wireless Communications*, Cambridge University Press, Cambridge, UK, (May 2003).

Rende, D., et al., "Bit Interleaved Space-frequency Coded Modulation for OFDM Systems", *IEE International Conference on Communication*, vol. 1 of 5, Wireless Information and Networking Group, ICC 2003, (May 11, 2003), 2827-2831.

Sampath, H., et al., "Linear Precoding and Decoding for Multiple Input Multiple Output(MIMO) Wireless Channels", Dissertation, Doctor of Philosophy, Department of Electrical Engineering, Stanford University, (Apr. 2001), 157 pgs.

* cited by examiner

MULTICARRIER RECEIVERS AND METHODS FOR SEPARATING TRANSMITTED SIGNALS IN A MULTIPLE ANTENNA SYSTEM

TECHNICAL FIELD

Embodiments of the present invention pertain to electronic communications and in some embodiments, to multicarrier communications.

BACKGROUND

Wireless signals that are transmitted with more than one transmit antenna or over more than one non-orthogonal spatial channel on the same frequencies are combined in the communication channel. These signals should be separated again in the receiver for proper decoding. Some conventional receivers employ maximum-likelihood (ML) decoding to separate different transmitted signals. These maximum-likelihood decoding techniques are computationally expensive, even for signals transmitted with as few as two transmit antennas. Some other conventional receivers employ minimum-mean-squared error (MMSE) decoding to reduce the amount of computations for separating different transmitted signals. In many situations, MMSE decoding techniques fall significantly short of ML decoding techniques and may result in a significant reduction in performance, especially for a practical wireless communication system.

Thus, there are general needs for receivers and methods of decoding signals transmitted with more than transmit antenna or over more than one spatial channel. There are also needs for receivers and methods of decoding signals with reduced processing. There are also needs for receivers and methods of decoding signals with better performance.

BRIEF DESCRIPTION OF THE DRAWINGS

The appended claims are directed to some of the various embodiments of the present invention. However, the detailed description presents a more complete understanding of embodiments of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of embodiments of the invention encompasses the full ambit of the claims and all available equivalents of those claims. Such embodiments of the invention may be referred to, individually or collectively, herein by the term "invention" merely for convenience and without intending to voluntarily limit the scope of this application to any single invention or inventive concept if more than one is in fact disclosed.

Figure 1:
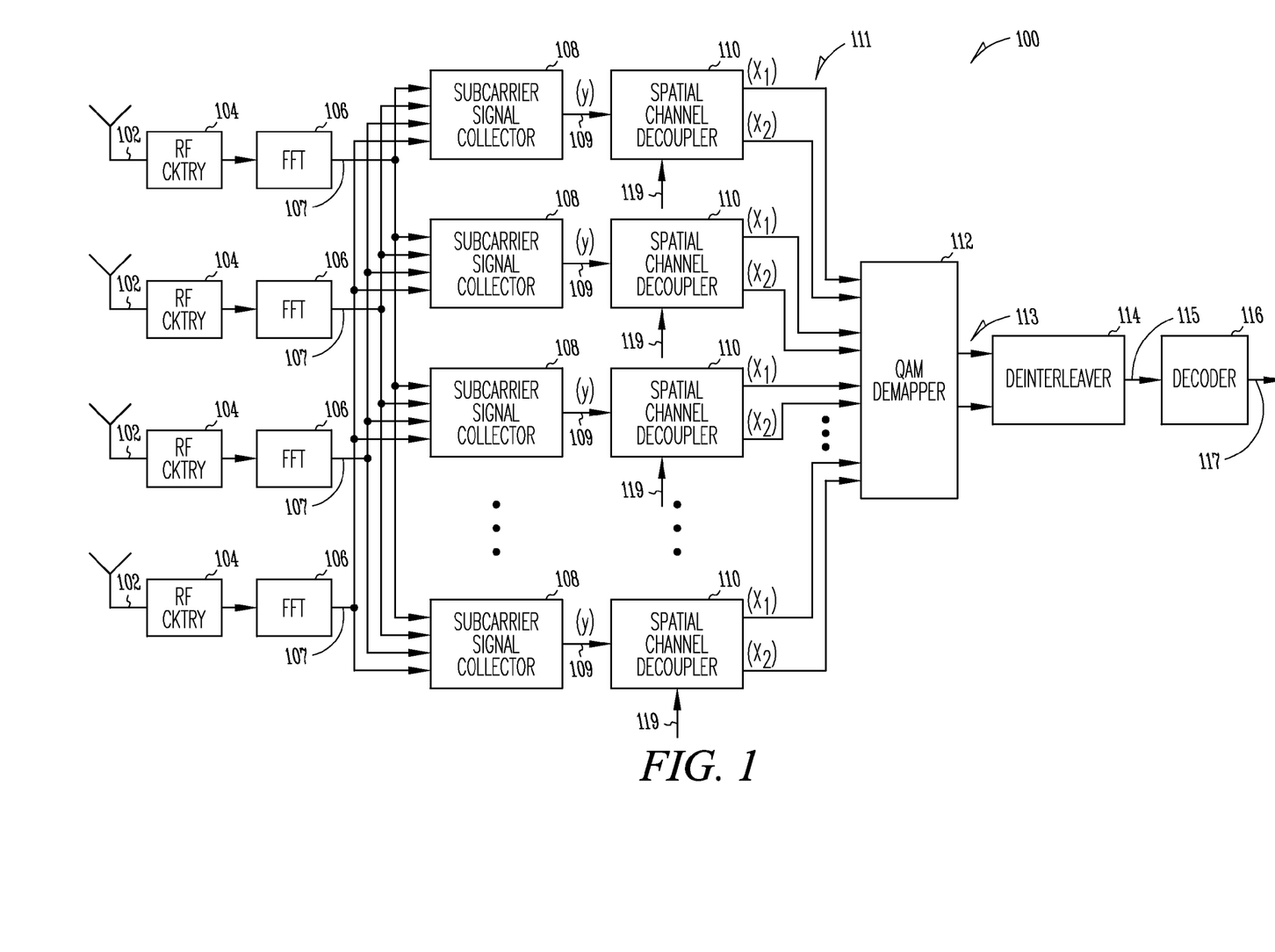
FIG. 1 is a block diagram of a receiver in accordance with some embodiments of the present invention.

FIG. 1 is a block diagram of a receiver in accordance with some embodiments of the present invention. Receiver 100 may be part of a wireless communication device and may receive multicarrier communication signals over a multicarrier communication channel having more than one spatial channel within a predetermined frequency spectrum. In some embodiments, the multicarrier communication signals may be orthogonal frequency division multiplexed (OFDM) communication signals or discrete multi-tone modulated (DMT) signals, although the scope of the invention is not limited in this respect. The multicarrier communication channel may comprise a plurality of orthogonal subcarriers. In some embodiments, the orthogonal subcarriers of the multicarrier channel may be closely spaced subcarriers, such as OFDM subcarriers. To achieve orthogonality between the closely spaced subcarriers, the subcarriers of a particular channel may have been transmitted with a null at substantially a center frequency of the other subcarriers of that channel, although the scope of the invention is not limited in this respect.

In some embodiments, a transmitting station may utilize more than one spatially-diverse transmit antenna to "divide" the channel into one or more spatial channels. In some embodiments, each transmit antenna may define one spatial transmit channel. In other embodiments, the transmitting station may employ beamforming techniques to "divide" the channel into spatial channels. In these embodiments, each spatial channel may be used to communicate separate or independent data streams on the same subcarriers as the other spatial channels, allowing the communication of additional data without an increase in frequency bandwidth. The use of spatial channels may take advantage of the multipath characteristics of the channel. In some embodiments, the spatial channels may be non-orthogonal channels, although the scope of the invention is not limited in this respect.

In some embodiments, a multicarrier symbol, such as an OFDM symbol, may be viewed as the combination of the symbols modulated on the individual subcarriers of the spatial channels. Because of the range in the number of bits that may be modulated per symbol on each subcarrier and the variable number of spatial channels that may be used, the number of bits per symbol may vary greatly. In some embodiments, subcarrier modulation assignments may be based on channel conditions, such as a signal to interference and noise ratio (SINR) for the particular subcarrier in a particular spatial channel. In some embodiments, the subcarrier modulation assignments may be selected by the receiving station and provided to the transmitting station, although the scope of the invention is not limited in this respect. In some embodiments, higher subcarrier modulation assignments (e.g., more bits per symbol) may be used for subcarriers having better SINRs.

Receiver 100 may comprise one or more of spatially diverse antennas 102 and radio-frequency (RF) circuitry 104 to receive a multicarrier symbol over a plurality of spatial channels. Receiver 100 may also comprise fast Fourier transform (FFT) circuitry 106 to generate frequency domain representations 107 of the multicarrier symbol received over the subcarriers. Receiver 100 may also comprise subcarrier signal collectors 108 to collect signals of an associated subcarrier from each of FFT circuitry 106 to generate complex signals 109. Each of complex signals 109 may include signal components that were separately transmitted on the same subcarrier frequency with more than one transmit antenna or over more than one spatial channel. For proper decoding, the signal components of complex signals 109 should be separated.

Receiver 100 may also comprise spatial channel decouplers 110 to separate from complex signals 109, the signal components separately transmitted with more than one transmit antenna or over more than one spatial channel. Spatial channel decouplers 110 may use channel estimates 119 and may generate transmitted complex signals 111 having components (e.g., x1 and x2) for each transmit antenna or each transmit spatial channel. In some embodiments, receiver 100 may be provided the number of transmit antennas used by a transmitting station as part of channelization information of a packet.

Receiver 100 may also comprise demapper 112 to demap symbols from each subcarrier to bits based on the modulation order used in transmission. In some embodiments, demapper 112 may generate bits from signals 111 for each transmit antenna or each transmit spatial channel. In some embodiments, demapper 112 may include functionally separate demapper circuitry for each subcarrier of the channel. In some embodiments, demapper 112 may include functionally separate demapper circuitry for each transmit antenna or each transmit spatial channel, although the scope of the invention is not limited in this respect.

Receiver 100 may also comprise deinterleaver 114 to perform a deinterleaving operation on blocks of bits 113 provided by demapper 112. Receiver 100 may also comprise decoder 116 to decode demapped blocks of bits 115 to generate decoded bit sequence 117. Decoder 116 may be an error correcting decoder or convolutional decoder, although the scope of the invention is not limited in this respect.

In some embodiments, receiver 100 may include an RF chain for each spatial channel. The RF chain may comprise one of RF circuitry 104 and an associated one of FFT circuitry 106 for each spatial channel. FIG. 1 illustrates a receiver with four RF chains; however the scope of the invention is not limited in this respect. In some embodiments, antennas 102 may be spatially diverse antennas and each may be associated with a spatial channel. Although one of antennas 102 is illustrated for each RF chain, this is not a requirement.

In some other embodiments, beamforming techniques may be employed to provide more than one spatial channel in a multicarrier communication channel. For example, instead of one antenna 102 for each RF chain (as illustrated), a beamformer (not illustrated) may be provided between one or more antennas 102 and RF circuitry 104.

Subcarrier signal collectors 108 may be associated with particular subcarrier frequencies rather than spatial channels so that any one signal collector 108 may collect signals for corresponding subcarriers (i.e., the same subcarrier frequency) of each of the spatial channels. Multiple symbols for each subcarrier may be collected and/or combined by each signal collector 108 to generate complex received signals 109 having signal components from each transmitted signal.

In accordance with some embodiments of the present invention, spatial channel decouplers 110 may separate signal components (e.g., x1 and x2) of a multicarrier signal transmitted over a plurality of spatial channels. In these embodiments, spatial channel decouplers 110 may perform a decomposition on a channel estimate matrix (H) to generate a unitary orthogonal matrix (Q) and an upper triangular matrix (R). The channel estimate matrix (H) may comprise a matrix of channel estimates 119 (i.e., the channel response) at a particular subcarrier frequency for the different spatial channels between receiver 100 and a transmitting station. In some embodiments that comprise M transmit antennas and N receiver antennas, the channel estimate matrix may be an M×N matrix. In some embodiments, M and N may range from two to ten, although the scope of the invention is not limited in this respect.

In some embodiments that receive signals transmitted over two transmit spatial channels, spatial channel decouplers 110 may multiply received complex signals (y) 109 by a conjugate transpose (Q*) of the unitary orthogonal matrix (Q) to generate a z-vector. In some embodiments, spatial channel decouplers 110 may estimate transmitted complex signal components (e.g., x1 and x2) of the multicarrier signal from the upper triangular matrix (R), and components of the z vector. In some embodiments, each of spatial channel decouplers 110 may estimate a second transmitted complex signal (x2) representing a second signal component on a particular subcarrier frequency of the transmitted multicarrier signal solely from a portion of the upper triangular matrix (R) and a second component of the z-vector (z2). In some embodiments, each of spatial channel decouplers 110 may then estimate a first transmitted complex signal (x1) representing a first signal component of the transmitted multicarrier signal based on the estimated transmitted complex signal (x2), a portion of the upper triangular matrix (R), and a first component of the z vector (z1). This is further described below.

In these embodiments, received complex signals (y) 109 may be represented by the following equation:

$$y = Hx + v,\qquad\text{Eq. 1:}$$

where H represents the channel estimate matrix, x represents the transmitted complex signal and v represents noise.

The channel estimate matrix (H) may be represented by the following equation:

$$H = QR,\qquad\text{Eq. 2:}$$

where Q represents the unitary orthogonal matrix and R represents the upper triangular matrix of the QR decomposition of matrix H.

By substituting QR for H in Eq. 1 and multiplying both sides of Eq. 1 by a conjugate transpose (Q*) of the unitary orthogonal matrix (Q), the following equation may result:

$$z = Rx + n,\qquad\text{Eq. 3:}$$

where z is the received complex signals (y) multiplied by conjugate transpose (Q*), R is the upper triangular matrix, x represents the transmitted complex signals, and n (a vector) represents noise. The conjugate transpose of the unitary orthogonal matrix (Q) may be a hermitian of the unitary orthogonal matrix and may be viewed as a hermitian matrix (Q*).

In some embodiments in which either two transmit antennas or two spatial transmit channels are used for transmitting signals, as shown below, the vector z may have first and second components, the matrix R may be viewed as an upper diagonal matrix, and the transmitted complex signal (x) may have first and second components, as illustrated below.

$$z = \begin{bmatrix} z1 \\ z2 \end{bmatrix},\ R = \begin{bmatrix} r1 & r3 \\ 0 & r2 \end{bmatrix},\ x = \begin{bmatrix} x1 \\ x2 \end{bmatrix}$$

In these embodiments, the following equations may be generated from the above:

$$z1 = r1 \times 1 + r3 \times 2 + n1 \quad \text{Eq. 4:}$$

$$z2 = 0 \times 1 + r2 \times 2 + n2 \quad \text{Eq. 5:}$$

The second transmitted complex signal (x2) (i.e., the signal transmitted by a second transmit antenna and/or over a second spatial channel) may be estimated using Eq. 5. Based on Eq. 5, the second transmitted complex signal (x2) may be an interference-free estimate (i.e., without contribution from x1). In some embodiments, the second transmitted complex signal (x2) may be estimated by scalar methods such as equalization and slicing, although the scope of the invention is not limited in this respect. The second transmitted complex signal (x2) may be viewed as lying on a grid of real and imaginary signals.

Once the second transmitted complex signal (x2) is estimated from Eq. 5, Eq. 4 may be used to estimate the first transmitted complex signal (x1) (i.e., the signal transmitted by the first transmit antenna and/or over a first spatial channel). In some embodiments, the first transmitted complex signal (x1) may be estimated by nulling and canceling techniques.

In some embodiments, each of spatial channel decouplers 110 may provide the estimated first and second transmitted complex signals (x1 and x2) 111 for a particular subcarrier frequency as its output. In some embodiments, the first and second transmitted complex signals (x1 and x2) may be complex quadrature-amplitude-modulated (QAM) signals, although the scope of the present invention is not limited in this respect.

Estimates for the first and second transmitted complex signals (x1 and x2) may have been affected by noise. In some embodiments, spatial channel decouplers 110 may perform further operations to revise the estimates for the first and second transmitted complex signals (x1 and x2). In these embodiments, spatial channel decouplers 110 may estimate nearest neighbors of the transmitted complex signal (x2) and may also re-estimate the transmitted complex signal (x1) for each of the nearest neighbors of the transmitted complex signal (x2). Spatial channel decouplers 110 may also compute Euclidian distances between components of the z vector and H* (i.e., the initially computed transmitted complex signal (x1) and the estimated transmitted complex signal (x2)), and between components of the received z-vector and H* (i.e., the re-estimated transmitted complex signals (x1) and the corresponding neighbors of transmitted complex signal (x2)). In these embodiments, spatial channel decouplers 110 may select the pair of estimates for the transmitted complex signals (including the neighbors and estimates based on the neighbors) with the lowest computed distance. The selected pair may be a revised estimate for the first and second transmitted complex signals (x1 and x2). In these embodiments, spatial channel decouplers 110 may provide the revised estimate for the first and second transmitted complex signals (x1 and x2) 111 as its output. In some embodiments, crosstalk (i.e., interference) between non-orthogonal spatial channels may be substantially decoupled or separated from received complex signals (y) 109.

In some embodiments, the nearest neighbors (xn) of the estimated second transmitted complex signal (x2) may be calculated by determining other closest points to the second component of the z vector (z2) on a grid of real and imaginary signals representing the estimated second transmitted complex signal (x2). In this way, the computed Euclidian distance using the neighbors may be only slightly larger than the Euclidian distance using the original estimate (e.g., $\|z2 - r2^* \text{neighbor of } x2\|$ may be slightly larger than $\|z2 - r2^* x2\|$).

In some embodiments, the Euclidian distance may be computed by the following equation:

$$E0 = \|y - Hx\|^2 \quad \text{Eq. 6:}$$

Although Eqs. 1 through 6 are depicted for some embodiments of the present invention in which signals are transmitted with either two transmit antennas or employing two spatial channels, these equations may be extended for embodiments of the present invention in which signals are transmitted with more than two antennas or over more than two spatial channels.

In some embodiments, the channel estimate matrix (H) may comprise a matrix of channel estimates at a specific subcarrier frequency for the spatial channels between receiver 100 and a transmitting station. In some embodiments, the plurality of spatial channels may comprise four spatial channels defined by paths between each transmit antenna of a pair of transmit antennas and each receive antenna of a pair receive antennas. In this case, the channel estimate matrix (H) may comprise a 2×2 matrix. In some other embodiments, the plurality of spatial channels may comprise up to sixteen spatial channels defined by paths between each transmit antenna of up to four transmit antennas and each receive antenna of up to four receive antennas. In this case, the channel estimate matrix (H) may comprise up to a 4×4 matrix. Embodiments of the present invention are also suitable for almost any number spatial channels.

In some embodiments, the transmitted multicarrier signals may comprise two multicarrier signal components of a single multicarrier symbol transmitted substantially simultaneously over the plurality of spatial channels. Each multicarrier signal component may comprise a plurality of symbol-modulated subcarriers transmitted on orthogonal symbol-modulated subcarriers of the multicarrier channel. The spatial channels may be non-orthogonal channels, each employing symbol-modulated subcarriers of the same frequencies (i.e., tones of the same frequency).

In some embodiments, each of spatial channel decouplers 110 may provide the estimated first and second transmitted complex signals (x1 and x2) 111 as its output for one subcarrier of the plurality of subcarriers comprising the multicarrier channel. In some embodiments, channel estimates 119 may be channel estimates for each one of the subcarrier frequencies, and accordingly, there may be a channel matrix (H) for each subcarrier frequency.

In some embodiments, demapper 112 may perform quadrature amplitude modulation (QAM) demapping on the first transmitted complex signal (x1) and the second transmitted complex signal (x2) to generate bits 113 corresponding to the first and second transmitted complex signals (x1 and x2) for each subcarrier. Deinterleaver 114 may deinterleave bits 113 to generate deinterleaved bits 115. Decoder 116 may decode (and in some embodiments combine) deinterleaved bits 115 corresponding to the first and second transmitted complex signals (x1 and x2) to generate combined bit stream 117 from all subcarriers representing a transmitted multicarrier symbol. In other embodiments, the combining of bits separated from the separately transmitted signals may be performed by deinterleaver 114, although the scope of the invention is not limited in this respect.

In some embodiments, the frequency spectrums for the multicarrier channel may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable.

In some embodiments, receiver 100 may be a personal digital assistant (PDA), a laptop or portable computer with wireless communication capability, a web tablet, a wireless telephone, a wireless headset, a pager, an instant messaging device, a digital camera, an access point or other device that may receive and/or transmit information wirelessly. In some embodiments, RF circuitry 104 may receive RF communications in accordance with specific communication standards, such as the Institute of Electrical and Electronics Engineers (IEEE) standards including IEEE 802.11(a), 802.11(b), 802.11(g/h), 802.11(n) and/or 802.16 standards for wireless local area networks, although receiver 100 may also be suitable to receive communications in accordance with other techniques including the Digital Video Broadcasting Terrestrial (DVB-T) broadcasting standard, and the High performance radio Local Area Network (HiperLAN) standard.

Although some embodiments of the present invention are discussed in the exemplary context of an 802.11x implementation (e.g., 802.11a, 802.11g, 802.11 HT, etc.), the claims are not so limited. Indeed, embodiments of the present invention may well be implemented as part of any wireless system using multicarrier wireless communication channels (e.g., orthogonal frequency-division multiplexing (OFDM), discrete multi-tone modulation (DMT), etc.), such as may be used within, without limitation, a wireless personal area network (WPAN), a wireless local area network (WLAN), a wireless metropolitan area network (WMAN), a wireless wide area network (WWAN), a cellular network, a third generation (3G) network, a fourth generation (4G) network, a universal mobile telephone system (UMTS), and the like communication systems.

In some embodiments, antennas 102 may comprise one or more of a directional or omnidirectional antenna, including, for example, a dipole antenna, a monopole antenna, a loop antenna, a microstrip antenna or other type of antenna suitable for reception and/or transmission of RF signals which may be processed by RF circuitry 104.

In accordance with some embodiments, the subcarriers of each spatial channel may have been individually symbol-modulated in accordance with individual subcarrier modulation assignments. This may be referred to as adaptive bit loading (ABL). Accordingly, a variable number of bits may be represented by a symbol-modulated on a subcarrier. The modulation assignments for each spatial channel may be based on the channel characteristics or channel conditions for that spatial channel, although the scope of the invention is not limited in this respect. In some embodiments, the subcarrier modulation assignments may range from zero bits per symbol to up to ten or more bits per symbol. In terms of modulation levels, the subcarrier modulation assignments may comprise binary phase shift keying (BPSK), which communicates one bit per symbol, quadrature phase shift keying (QPSK), which communicates two bits per symbol, 8PSK, which communicates three bits per symbol, 16-quadrature amplitude modulation (16-QAM), which communicates four bits per symbol, 32-QAM, which communicates five bits per symbol, 64-QAM, which communicates six bits per symbol, 128-QAM, which communicates seven bits per symbol, and 256-QAM, which communicates eight bits per symbol. Subcarrier modulation assignments with higher data communication rates per subcarrier (e.g., ten bits) may also be used. In other embodiments, the same subcarrier modulation assignment may be employed on most or all subcarriers of a multicarrier signal.

Although receiver 100 is illustrated as having several separate functional elements, one or more of the functional elements may be combined and may be implemented by combinations of software-configured elements, such as processing elements including digital signal processors (DSPs), and/or other hardware elements. For example, the elements illustrated may comprise one or more microprocessors, DSPs, application specific integrated circuits (ASICs), and combinations of various hardware and logic circuitry for performing at least the functions described herein.

Figure 2:
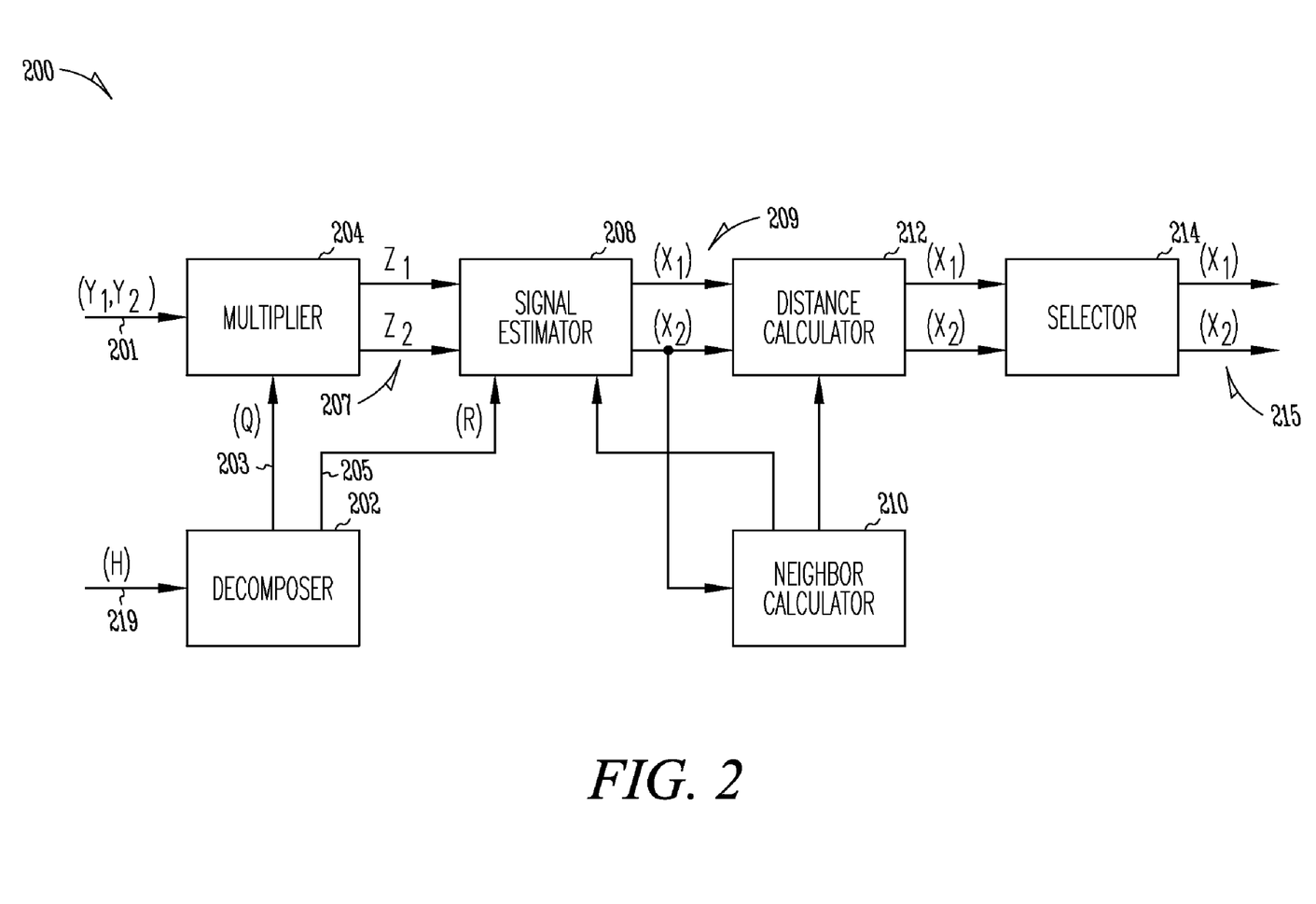
FIG. 2 illustrates a block diagram of a spatial channel decoupler in accordance with some embodiments of the present invention.

FIG. 2 illustrates a block diagram of a spatial channel decoupler in accordance with some embodiments of the present invention. Spatial channel decoupler 200 may be suitable for use as one of spatial channel decouplers 110 (FIG. 1), although other spatial channel decoupler configurations may also be suitable. From received signals (y1 and y2) 201, spatial channel decoupler 200 may separate signal components that were separately transmitted with more than one transmit antenna or over more than one spatial channel.

Spatial channel decoupler 200 may comprise decomposer 202 to perform a QR decomposition on a channel estimate matrix (H). The channel matrix may be generated from channel estimates 219 for the appropriate subcarrier frequency. Decomposer 202 may generate a unitary orthogonal matrix (Q) and upper triangular matrix (R) 205 from the channel estimate matrix (H).

Spatial channel decoupler 200 may also comprise multiplier 204 to multiply received complex signals (y1 and y2) 201 by conjugate transpose (Q*) 203 of the unitary orthogonal matrix (Q) to generate z-vector 207. In some embodiments, decomposer 202 may generate conjugate transpose (Q*) 203, while in other embodiments, multiplier 204 may generate conjugate transpose (Q*) from the unitary orthogonal matrix (Q).

Spatial channel decoupler 200 may also comprise transmitted signal initial estimator 208 to estimate transmitted complex signal components (x1 and x2) of the multicarrier signal from the upper triangular matrix (R), and components of the z vector. In some embodiments, signal initial estimator 208 may generate an initial estimate of a transmitted complex signal, such as second transmitted complex signal (x2) representing a second signal component of the multicarrier signal. Estimator 208 may use the upper triangular matrix (R) 205 and components of z-vector (z2) 207. Transmitted signal initial estimator 208 may also estimate other transmitted complex signals, such as first transmitted complex signal (x1) representing a first signal component of the multicarrier signal. Estimator 208 may use the previously estimated transmitted complex signal, such as second transmitted complex signal (x2), upper triangular matrix (R) 205, and components of z-vector (z1) 207.

In some embodiments, spatial channel decoupler 200 may also comprise nearest neighbor calculator 210 to estimate nearest neighbors. In some embodiments, nearest neighbor calculator 210 may estimate nearest neighbors of the transmitted complex signal (x2) and may also re-estimate the transmitted complex signal (x1) for each of the nearest neighbors estimated for the transmitted complex signal (x2). In some embodiments, the nearest neighbors may be based on Euclidian distances computed between components of the z vector and H* (i.e., the initially computed transmitted complex signal (x1) and the estimated transmitted complex signal (x2)), and between components of the received z-vector and H* (i.e., the re-estimated transmitted complex signals (x1) and the corresponding neighbors of transmitted complex signal (x2)).

In some embodiments, Euclidian distance calculator 212 may be used to compute Euclidian distances. In the case of two transmit antennas or two spatial channels, Euclidian distance calculator 212 may compute Euclidian distances between the estimated first transmitted complex signals (x1) and the initially estimated second transmitted complex signal (x2), and between each re-estimated first transmitted complex signals (x1) (e.g., corresponding to the nearest neighbor of second transmitted complex signals (x2)) and each neighbor of the initially estimated second transmitted complex signals (x2).

In some embodiments, spatial channel decoupler 200 may also comprise selector 214 to select a set of transmitted complex signals associated with a lowest computed Euclidian distance. In the case of two transmit antennas or two spatial channels, a selected pair may corresponding to the first and second transmitted complex signal components (x1 and x2) 215 and may be provided as an output.

Although spatial channel decoupler 200 is illustrated for embodiments of the present invention that receive signals transmitted over two spatial channels or with two transmit antennas, the scope of the present invention is not limited in this respect. In some embodiments, spatial channel decoder 200 may be suitable to decouple signals transmitted using more than two spatial channels or more than two transmit antennas.

Although spatial channel decoupler 200 is illustrated as having several separate functional elements, one or more of the functional elements may be combined and may be implemented by combinations of software-configured elements, such as processing elements including digital signal processors (DSPs), and/or other hardware elements. For example, the elements illustrated may comprise one or more microprocessors, DSPs, application specific integrated circuits (ASICs), and combinations of various hardware and logic circuitry for performing at least the functions described herein.

Figure 3:
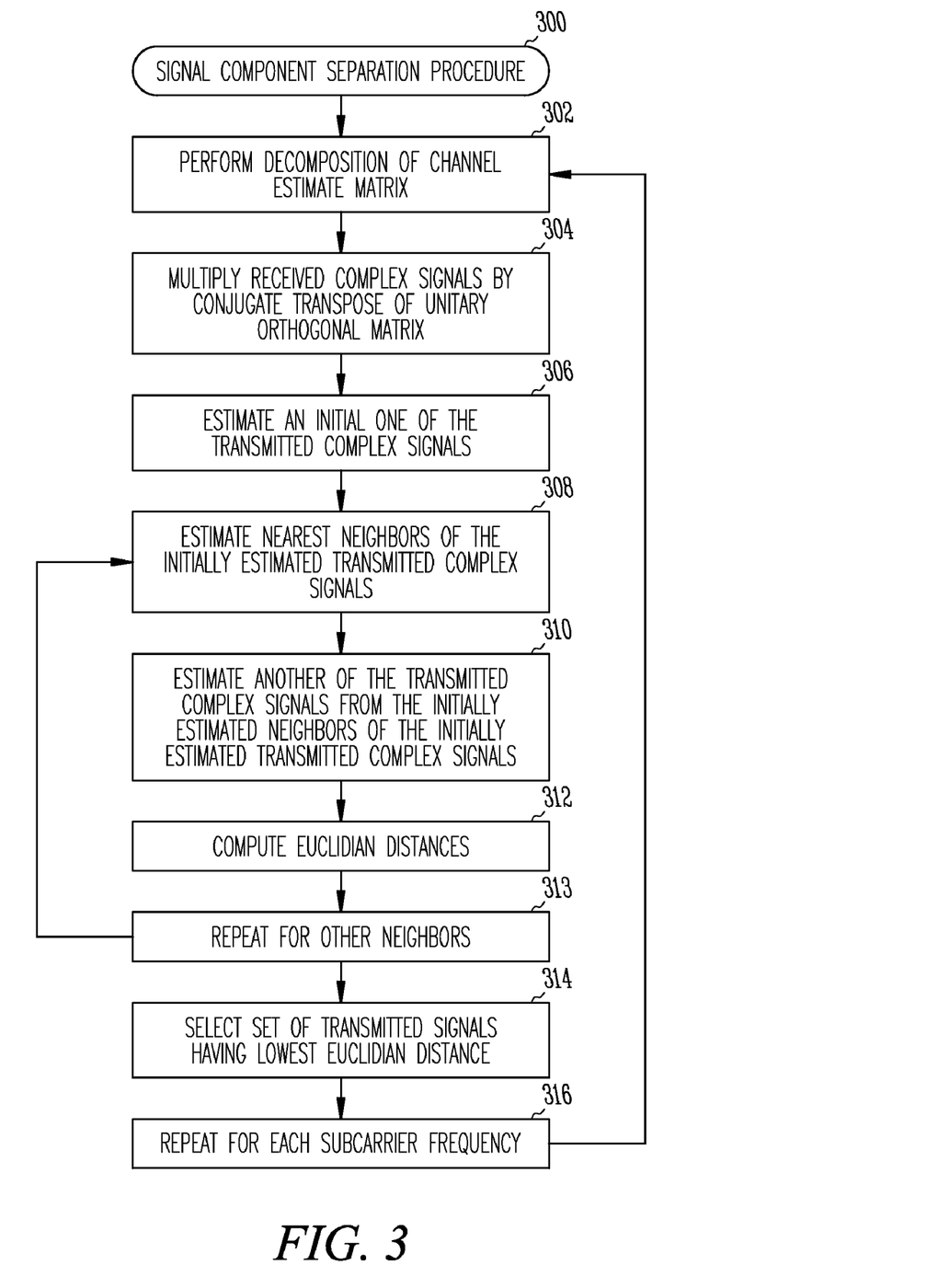
FIG. 3 illustrates a signal component separation procedure in accordance with some embodiments of the present invention.

FIG. 3 illustrates a signal component separation procedure in accordance with some embodiments of the present invention. Procedure 300 may be performed by a receiver, such as receiver 100 (FIG. 1), although other receivers and receiving stations may also perform procedure 300. In some embodiments, procedure 300 may be performed by one or more spatial channel decouples, such as spatial channel decoupler 200 (FIG. 2). Procedure 300 may be used to separate signal components of a multicarrier signal transmitted using a plurality of transmit antennas or over a plurality of spatial channels.

Operation 302 comprises performing a decomposition on a channel estimate matrix (H) to generate a unitary orthogonal matrix (Q) and an upper triangular matrix (R). In some embodiments, operation 302 may be performed by decomposer 202 (FIG. 2), although the scope of the invention is not limited in this respect.

Operation 304 comprises multiplying received complex signals (y) by a conjugate transpose (Q*) of the unitary orthogonal matrix (Q) to generate a z-vector. In some embodiments, operation 304 may be performed by multiplier 204 (FIG. 2), although the scope of the invention is not limited in this respect.

Operation 306 comprises estimating transmitted complex signal components (e.g., x1 and x2) of the multicarrier signal from the upper triangular matrix (R), the upper triangular matrix (R), and components of the z vector. In some embodiments, operation 306 comprises estimated a transmitted complex signal, such as second transmitted complex signal (x2) representing a second signal component of the multicarrier signal. Operation 306 may utilize a portion of the upper triangular matrix (R) and one or more components of the z-vector. In some embodiments, operation 306 may be performed by signal estimator 208 (FIG. 2), although the scope of the invention is not limited in this respect.

Operation 308 comprises estimating nearest neighbors of the transmitted complex signal estimated in operation 306. In some embodiments, operation 308 may be performed by neighbor calculator 210 (FIG. 2), although the scope of the invention is not limited in this respect.

Operation 310 comprises estimating other transmitted complex signals, such as a first transmitted complex signal (x1) representing a first signal component of the multicarrier signal. In some embodiments, operation 310 may utilize the previously or initially estimated neighbors of the previously or initially estimated transmitted complex symbol, such as second transmitted complex signal (x2), the upper triangular matrix (R), and components of the z vector. In some embodiments, operation 310 may be performed by signal estimator 208 (FIG. 2), although the scope of the invention is not limited in this respect.

In some embodiments, the estimated transmitted complex signals may be provided for subsequent QAM demapping. In some other embodiments, procedure 300 may also include performing operations 312 through 314 to further revise the estimates.

Operation 312 comprises computing Euclidian distances between the transmitted complex signal estimated in operation 306 and the transmitted complex signals estimated in operation 310. Operation 312 may also comprise computing Euclidian distances between the transmitted complex signal estimated in operation 306 and each neighbor estimated in operation 308. In some embodiments, operation 312 may be performed by distance calculator 212 (FIG. 2), although the scope of the invention is not limited in this respect.

Operation 313 comprises repeating operations 308 through 312 for other neighbors as part of a recursive process. For example, each repetition of operations 308 through 312 may use the one or more of the neighbors from the prior operations. In this way, in the case of two transmit and two receive antennas, an estimate for first transmitted complex signal (x1) may be generated for each neighbor of second transmitted complex signal (x2). In some embodiments, operation 313 may be performed by signal estimator 208 (FIG. 2), neighbor calculator 210 (FIG. 2) and distance calculator 212 (FIG. 2) in conjunction with a system controller (not separately illustrated in FIG. 2), although the scope of the invention is not limited in this respect.

Operation 314 comprises selecting a set of transmitted complex signals associated with a lowest computed distance. In the case of two transmit antennas or two transmit spatial channels, the selected set may correspond to the first and second transmitted complex signal components (x1 and x2). In some embodiments, operation 314 may be performed by selector 214 (FIG. 2), although the scope of the invention is not limited in this respect.

In multicarrier embodiments, operation 316 comprises repeating operations 302 through 314 for each subcarrier frequency. In some embodiments, operations 302 through 314 may be performed concurrently for each subcarrier frequency, such as by a plurality of spatial channel decoders, such as spatial channel decoders 110 (FIG. 1). In some embodiments, operation 316 may be performed by a separate one of spatial channel decouplers, such as spatial channel decouplers 110 (FIG. 1) for each subcarrier of the multicarrier communication channel, although the scope of the invention is not limited in this respect. In these embodiments, each spatial channel decoupler may perform operations 302 through 314 in parallel for a particular subcarrier frequency.

Although the individual operations of procedure 300 are illustrated and described as separate operations, one or more of the individual operations may be performed concurrently, and nothing requires that the operations be performed in the order illustrated.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer-readable memory that may be volatile or non-volatile memory or a combination thereof. Moreover, as used herein, data refers to one or more storage data elements, which can include portions of files, a single file, a file extent, a database, a storage device partition, a volume, sets of volumes and the like. The data need not reside on a single storage device and may span multiple storage devices.

Some embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention lies in less than all features of a single disclosed embodiment. Thus the following claims are hereby incorporated into the detailed description, with each claim standing on its own as a separate preferred embodiment.

What is claimed is:

1. A method of separating signal components comprising:
   performing a decomposition on a channel estimate matrix to generate a unitary orthogonal matrix and an upper triangular matrix;
   multiplying received complex signals by a conjugate transpose of the unitary orthogonal matrix to generate a z-vector; and
   estimating transmitted complex signal components of a multicarrier signal from the upper triangular matrix, and components of the z vector.

2. The method of claim 1 wherein estimating comprises:
   estimating a second transmitted complex signal representing a second signal component of the multicarrier signal from the upper triangular matrix and a second component of the z-vector; and
   estimating a first transmitted complex signal representing a first signal component of the multicarrier signal based on the estimated second transmitted complex signal, the upper triangular matrix, and a first component of the z vector.

3. The method of claim 2 further comprising:
   estimating nearest neighbors of the estimated second transmitted complex signal;
   re-estimating the first transmitting complex signal for each of the nearest neighbors of the second transmitted complex signal;
   computing Euclidian distances between the first transmitted complex signal and the second transmitted complex signal, and between the re-estimated first transmitted complex signals and each neighbor of the second transmitted complex signal; and
   selecting a pair of signal estimates associated with the lowest computed distance, the selected pair corresponding to final estimates of the first and second transmitted complex signals.

4. The method of claim 3 wherein the transmitted complex signal components were transmitted separately over more than one non-orthogonal spatial channel using more than one corresponding transmit antennas, and
   wherein the final estimates of the first and second transmitted complex signals are substantially decoupled from crosstalk between the non-orthogonal spatial channels.

5. The method of claim 1 wherein the z-vector is equal to a noise factor plus the upper triangular matrix multiplied by an x-vector,
   wherein components of the x-vector represent individual complex signal components transmitted over corresponding individual spatial channels, and
   wherein the conjugate transpose of the unitary orthogonal matrix is a hermitian of the unitary orthogonal matrix comprising a hermitian matrix.

6. The method of claim 2 wherein estimating the second transmitted complex signal comprises generating a substantially interference-free estimate of the second transmitted complex signal, the interference-free estimate being substantially free from contributions of the first transmitted complex signal.

7. The method of claim 4 wherein the channel estimate matrix comprises a matrix of channel estimates for the plurality of spatial channels between a receiving station and a transmitting station.

8. The method of claim 7 wherein the plurality of spatial channels comprise spatial channels defined by communication paths between a pair of transmit antennas and a pair receive antennas, and
   wherein the channel estimate matrix comprises a 2×2 matrix.

9. The method of claim 7 wherein the plurality of spatial channels comprise spatial channels defined by:

either two transmit antennas or a single transmit antenna coupled to the transmitting station employing beamforming techniques to define two transmit spatial channels;

either two receive antennas or a single receive antenna coupled to the receiving station employing beamforming techniques to define two receive spatial channels, and wherein the channel estimate matrix comprises a 2×2 matrix of channel estimates for the spatial channels.

10. The method of claim 2 wherein the multicarrier signal comprises two orthogonal frequency division multiplexed signal components of a single orthogonal frequency division multiplexed symbol transmitted substantially simultaneously over the plurality of spatial channels, wherein each orthogonal frequency division multiplexed signal component comprises a plurality of symbol-modulated subcarriers transmitted on orthogonal symbol-modulated subcarriers, and wherein the spatial channels are non-orthogonal channels, each employing symbol-modulated subcarriers of the same frequencies.

11. The method of claim 10 wherein the performing, the multiplying, the estimating a second transmitted complex signal, and the estimating a first transmitted complex symbol are performed for a first subcarrier of the plurality of symbol-modulated subcarriers, and wherein the method further comprises repeating the performing, the multiplying, the estimating a second transmitted complex signal, and the estimating a first transmitted complex symbol for other subcarriers of the plurality, and wherein performing the decomposition comprises performing a decomposition of a channel matrix of channel estimates for each of the subcarriers of the plurality of subcarriers.

12. The method of claim 10 wherein each of the two orthogonal frequency division multiplexed signal components is to have been modulated with separate data symbols of a single transmitted orthogonal frequency division multiplexed symbol.

13. The method of claim 12 further comprising:

for each subcarrier, performing a quadrature amplitude modulation demapping on the first transmitted complex signal and the second transmitted complex signal to generate corresponding first and second bits for each subcarrier; and deinterleaving and decoding the first and second bits from the subcarriers to generate a combined bit stream representing the single transmitted orthogonal frequency division multiplexed symbol.

14. A spatial channel decoupler comprising:

a decomposer to perform a decomposition on a channel estimate matrix to generate a unitary orthogonal matrix and an upper triangular matrix;

a multiplier to multiply received complex signals by a conjugate transpose of the unitary orthogonal matrix to generate a z-vector; and a transmitted signal estimator to estimate transmitted complex signal components of a multicarrier signal from the upper triangular matrix, and components of the z vector.

15. The decoupler of claim 14 wherein the transmitted signal estimator estimates a second transmitted complex signal representing a second signal component of the multicarrier signal from the upper triangular matrix and a second component of the z-vector, and wherein the transmitted signal estimator further estimates a first transmitted complex signal representing a first signal component of the multicarrier signal based on the estimated second transmitted complex signal, the upper triangular matrix, and a first component of the z vector.

16. The decoupler of claim 15 further comprising:

a neighbor calculator to estimate nearest neighbors of the second transmitted complex signal;

a distance calculator to compute Euclidian distances; and a selector, wherein the transmitted signal estimator re-estimates the first transmitted complex signal for each of the nearest neighbors of the second transmitted complex signal, wherein the distance calculator computes Euclidian distances between the first transmitted complex signal and the second transmitted complex signal, and between the re-estimated first transmitted complex signals and each neighbor of the second transmitted complex signal, and wherein the selector selects a pair of signal estimates associated with the lowest computed distance, the selected pair corresponding to a final estimate of the first and second transmitted complex signals.

17. The decoupler of claim 16 wherein the transmitted complex signal components were transmitted separately over more than one non-orthogonal spatial channel using more than one corresponding transmit antennas, and wherein the final estimate of the first and second transmitted complex signals is substantially decoupled from crosstalk between non-orthogonal spatial channels.

18. The decoupler of claim 14 wherein the z-vector is equal to a noise factor plus the upper triangular matrix multiplied by an x-vector, wherein components of the x-vector represent individual complex signal components transmitted over corresponding individual spatial channels, and wherein the conjugate transpose of the unitary orthogonal matrix is a hermitian of the unitary orthogonal matrix comprising a hermitian matrix.

19. The decoupler of claim 15 wherein the transmitted signal estimator is to generate an interference-free estimate of the second transmitted complex signal, the interference-free estimate being substantially free from contributions of the first transmitted complex signal.

20. The decoupler of claim 17 wherein the channel estimate matrix comprises a matrix of channel estimates for the plurality of spatial channels between a receiving station and a transmitting station, and wherein the receiving station comprises a spatial channel decoupler for each subcarrier frequency of an orthogonal frequency division multiplexed channel.

21. The decoupler of claim 20 wherein the plurality of spatial channels comprise four spatial channels defined by communication paths between a pair of transmit antennas coupled with the transmitting station and a pair receive antennas coupled with the receiving station, and wherein the channel estimate matrix comprises a 2×2 matrix.

22. A receiver comprising:

one or more receive antennas to receive a multicarrier signal having components separately transmitted through at least two spatial channels; and a spatial channel decoupler to separate the separately transmitted signal components of the received multicarrier signal, wherein the spatial channel decoupler comprises:
a decomposer to perform a decomposition on a channel estimate matrix to generate a unitary orthogonal matrix and an upper triangular matrix;
a multiplier to multiply received complex signals corresponding with the received multicarrier signals by a conjugate transpose of the unitary orthogonal matrix to generate a z-vector; and
a transmitted signal estimator to estimate transmitted complex signal components of the multicarrier signal from the upper triangular matrix, and components of the z vector.

23. The receiver of claim 22 wherein the transmitted signal estimator estimates a second transmitted complex signal representing a second signal component of the multicarrier signal from the upper triangular matrix and a second component of the z-vector, and
wherein the transmitted signal estimator further estimates a first transmitted complex signal representing a first signal component of the multicarrier signal based on the estimated transmitted complex signal, the upper triangular matrix, and a first component of the z vector.

24. The receiver of claim 23 wherein the spatial channel decoupler further comprises:
a neighbor calculator to estimate nearest neighbors of the second transmitted complex signal;
a distance calculator to compute Euclidian distances; and
a selector,
wherein the transmitted signal estimator is to re-estimate the first transmitted complex signal for each of the nearest neighbors of the second transmitted complex signal,
wherein the distance calculator computes Euclidian distances between the first transmitted complex signal and the second transmitted complex signal, and between the re-estimated first transmitted complex signals and each neighbor of the second transmitted complex signal, and
wherein the selector selects a pair of signal estimates associated with the lowest computed distance, the selected pair corresponding to a final estimate of the first and second transmitted complex signals.

25. The receiver of claim 22 wherein the received multicarrier signal comprises two orthogonal frequency division multiplexed signal components of a single orthogonal frequency division multiplexed symbol transmitted substantially simultaneously over the plurality of spatial channels,
wherein each orthogonal frequency division multiplexed signal component comprises a plurality of symbol-modulated subcarriers transmitted on orthogonal symbol-modulated subcarriers,
wherein the spatial channels are non-orthogonal channels, each employing symbol-modulated subcarriers of the same frequencies, and
wherein the receiver further comprises:
a spatial channel decoupler associated with each of the subcarriers to generate transmitted signal estimates for the associated subcarrier.

26. The receiver of claim 25 wherein each of the two orthogonal frequency division multiplexed signal components is to have been modulated with separate data symbols of a single transmitted orthogonal frequency division multiplexed symbol, and
wherein the receiver further comprises:
a demapper to perform a quadrature amplitude modulation demapping on the first transmitted complex signal and the second transmitted complex signal to generate corresponding first and second bits for each subcarrier; and
deinterleaver and decoder circuitry to deinterleave and decode the first and second bits to generate a combined bit stream representing the single transmitted orthogonal frequency division multiplexed symbol.

27. A machine-readable medium that provides instructions, which when executed by one or more processors, cause the processors to perform operations comprising:
performing a decomposition on a channel estimate matrix to generate a unitary orthogonal matrix and an upper triangular matrix;
multiplying received complex signals by a conjugate transpose of the unitary orthogonal matrix to generate a z-vector; and
estimating transmitted complex signal components of the multicarrier signal from the upper triangular matrix, and components of the z vector.

28. The machine-readable medium of claim 27 wherein the instructions, when further executed by one or more of the processors cause the processors to perform operations further comprising:
estimating a second transmitted complex signal representing a second signal component of the multicarrier signal from the upper triangular matrix and a second component of the z-vector; and
estimating a first transmitted complex signal representing a first signal component of the multicarrier signal based on the estimated second transmitted complex signal, the upper triangular matrix, and a first component of the z vector.

29. The machine-readable medium of claim 28 wherein the instructions, when further executed by one or more of the processors cause the processors to perform operations, comprising:
estimating nearest neighbors of the second transmitted complex signal;
re-estimating the first transmitting complex signal for each of the nearest neighbors of the second transmitted complex signal;
computing Euclidian distances between the first transmitted complex signal and the second transmitted complex signal, and between the re-estimated first transmitted complex signals and each neighbor of the second transmitted complex signal; and
selecting a pair of signal estimates associated with the lowest computed distance, the selected pair corresponding to a final estimate of the first and second transmitted complex signals,
the final estimate of the first and second transmitted complex signals being substantially decoupled from crosstalk between non-orthogonal spatial channels comprising orthogonal symbol modulated orthogonal subcarriers.

30. The machine-readable medium of claim 27 wherein the instructions, when further executed by one or more of the processors cause the processors to perform operations, wherein the z-vector is equal to a noise factor plus the upper triangular matrix multiplied by an x-vector, and
wherein components of the x-vector represent individual complex signal components transmitted over corresponding individual spatial channels.

31. The machine-readable medium of claim 27 wherein the instructions, when further executed by one or more of the processors cause the processors to perform operations, wherein the conjugate transpose of the unitary orthogonal matrix is a hermitian of the unitary orthogonal matrix comprising a hermitian matrix.

32. The machine-readable medium of claim 28 wherein the instructions, when further executed by one or more of the processors cause the processors to perform operations, wherein estimating the second transmitted complex signal comprises generating an interference-free estimate of the second transmitted complex signal, the interference-free estimate being substantially free from contributions of the first transmitted complex signal.

33. The machine-readable medium of claim 27 wherein the instructions, when further executed by one or more of the processors cause the processors to perform operations, wherein the channel estimate matrix comprises a matrix of channel estimates for the plurality of spatial channels between a receiving station and a transmitting station.

\* \* \* \* \*